Patented Feb. 8, 1949

2,461,480

UNITED STATES PATENT OFFICE 2,461,480

METHOD OF PREPARING LIGHT FILTER FOILS

Verne H. Reckmeyer, Binghamton, N. Y., assignor to General Aniline & Film Corporation, New York, N. Y., a corporation of Delaware No Drawing. Application May 11, 1945, Serial No. 593,329

10 Claims. (Cl. 18—57)

This invention relates to light filters and more particularly to an improved method of preparing light filter foils.

In the manufacture of filter foils from gelatin and other filter carrying media such as, for example, polyamide, hydroxyethyl cellulose, polyvinyl acetaldehyde acetal resins, and the like, it is common practice to coat an aqueous solution of dyed gelatin or other filter carrying media onto a sheet of polished plate glass. The solution is then chilled and dried. When dry, the foil is stripped from the plate and cut to size. Normally the dry gelatin and other filter carrying media peel from the plate erratically and with difficulty, and as a result the foil is either torn or wrinkled. In addition, some of the dyes which are used to color the filter carrying medium promote adhesion of the dried foil to glass to such an extent that it is impossible to remove the foil. To permit a ready stripping of the dried foil from the glass it has been taught that the glass should be waxed or polished with chalk. This expedient, however, has never been found to be particularly satisfactory since waxing or polishing of the glass does not always work and sometimes transfers a poor surface to the side of the foil in contact with the glass.

I have found that the above difficulties can be obviated and a more rapid and economical method of preparing filter foils provided by coating a filter carrying medium on a flat and smooth surface constructed from any material which is resistant to hydrogen chloride, and which smooth surface has been treated with a composition comprising an organo-silicon halide (or mixture of organo-silicon halides) in vapor form. It is absolutely essential that the smooth surface of the coating or casting material be resistant to hydrogen chloride, otherwise the surface becomes pitted and corroded by the hydrogen chloride which is liberated after treatment with vapors of the organo-silicon halide. Should the surface be pitted or corroded, foils having poor surface characteristics can only be obtained.

In a preferred embodiment of this invention, the smooth surface of the material resistant to hydrogen chloride upon which the filter carrying medium is to be coated or cast, is fumed or exposed to the vapors of an organo-silicon halide and the deposited material washed off with water to thoroughly clean the coating surface. The resulting surface is then used for coating filter foils. The foils adhere properly until dry and peel off without difficulty. When the surface of the casting substance is so treated, it may be used for a number of coatings without being re-exposed to or fumed with organo-silicon halide vapors.

In practicing the present invention, any suitable flat vitreous material resistant to hydrogen chloride, the coating surface of which is smooth, such as for example, plate glass, vitreosil, enameled metal plate, porcelain, fused quartz, fused silica, and the like, may be fumed or exposed to organo-silicon halide vapors and utilized as a coating or casting plate. The only requirement is that the surfaces of said coating support must be flat and smooth. Dyed gelatin and other filter carrying media will adhere to the treated plate during chilling, setting, and drying, and are readily peeled or otherwise removed after drying without injury to the dried foil.

Illustrative examples of organo-silicon halides are the alkyl silicon halides, e. g., methyl, ethyl, propyl, butyl, etc., silicon halides, the aryl silicon halides, e. g., phenyl silicon halides, etc., aralkyl silicon halides, phenyl-methyl silicon halides, etc., alkaryl silicon halides, e. g., tolyl silicon halides, etc., and compounds such as, for example, $(CH_3)_2HSiCl$ and similar alkyl, aryl, etc., halosilanes, specifically chlorosilanes, described in United States Patent 2,306,222. Of the various examples of organo-silicon halides described therein, methyl silicon chlorides, i. e., methyl silicon chloride, and a mixture of silicon chlorides consisting mainly of $(CH_3)SiCl_3$ and $$(CH_3)_2SiCl_2$$

are preferred in view of their availability in commercial quantities and in view of the fact that they vaporize very readily.

The filter carrying media, which can be used in the preparation of filter foils according to the present invention, are gelatin, water soluble cellulose derivatives, e. g., hydroxy-ethyl cellulose, polyamides or a mixture of gelatin with a polyamide as described in United States Patent 2,289,775; polyvinyl alcohol and gelling compound as described in United States Patent 2,249,537; polyvinyl acetaldehyde acetal resins and partially hydrolyzed acetate resins described in United States Patents 1,939,422 and 2,036,092. The polyvinyl acetaldehyde acetal resins having a polyvinyl acetaldehyde acetal content of at least 50% and an uncombined hydroxy content corresponding to at least 15% polyvinyl alcohol, and the partially hydrolyzed polyvinyl acetate resins having a polyvinyl acetate content of from about 20% to about 50% and a hydroxyl content corresponding from about 50 to 80% polyvinyl alcohol, are preferred.

For a fuller understanding of the nature of the invention, reference is made to the following examples which are given merely to further illustrate the invention, and they should not be regarded as limitative.

Example I

A stock solution of a 10% gelatin was prepared from a clear, colorless gelatin. To 70 cc. of this stock solution 1 cc. of glycerin and 1 cc. of a 5% aqueous solution of saponin were added with stirring. To this mixture 0.05 gram of tartrazine (yellow pyrazolone dye) was added with continued stirring followed by 0.5 cc. of a 10% aqueous solution of formaldehyde. After an additional stirring of about 1 or 2 minutes, the resulting mixture was filtered through cheese cloth. A glass plate having an area of 130 square inches, which had been previously fumed in an atmosphere of a mixture of methyl silicon chlorides and the deposited material washed off with water to thoroughly clean the surface, was carefully leveled and the filtered mixture poured onto it. As the gelatin solution is poured onto this treated glass plate, it is spread evenly over the surface. When the gelatin solution had been poured onto the plate, it was allowed to anneal or level off for a minute or two so as to smooth out any irregularities of thickness by flowing to its natural level state. The entire glass plate was then chilled at a temperature of about 32° F. for 5–10 minutes to set the mixture. When set, the gel-coated plate was dried for several hours at room temperature and then stripped with slight tension from the treated glass surface without wrinkling or tearing. The foil was then cut into appropriate sizes and shapes.

Example II

The following solution was made up according to Example I of the United States Patent 2,193,035:

| | |
|---|---|
| Polyvinyl acetaldehyde acetal resin having a polyvinyl acetate content of 1.6%, a hydroxyl content corresponding to 22.1% polyvinyl alcohol and a polyvinyl acetal content of 76.3%_____grams__ | 45 |
| Saponin _____do____ | 0.1 |
| Octyl alcohol_____cc__ | 0.01 |
| Rose Bengal (Schultz No. 595)_____grams__ | 1 |
| Water _____do____ | 405 |

This solution was coated on a flat, smooth, porcelain support having an area of 480 square inches, the smooth surface of which had been treated with vapors of methyl silicon chloride. After chilling and drying, the foil was stripped with slight tension from the porcelain plate without wrinkling or any other signs of injury.

In addition to the dyestuffs utilized in Examples I and II, any water, alcohol, or acetone soluble dye may be employed. The nature of the dye is immaterial so long as it is soluble in one of these solvents and gives the desired colorimetric results. As suitable examples of dyestuffs, which may be employed in the preparation of light filter foils in accordance with the present invention, are the penta-, hepta-, nona-, and undeca-methine-cyanines, described in U. S. Patent 2,075,153; pyrazole-orange-G (Schultz No. 747), Milling Yellow (Schultz No. 230), Erie Yellow Y (C. I. No. 365), Erie Pink 2B (C. I. No. 128), Brilliant Purperine 4B (Schultz No. 368), and the like.

While the present invention has been described in considerable detail with reference to certain preferred procedures, materials and uses, it is understood that the invention is not limited thereto, and that numerous variations may be made in the procedures herein described, and that equivalent materials may be substituted. All such modifications and variations are within the scope of the invention as defined by the appended claims.

I claim:

1. The method of making a photographic light filter foil which comprises coating an aqueous solution of an organic film-forming material selected from the class consisting of gelatin, hydroxyethyl cellulose, polyvinyl alcohol, polyvinyl acetaldehyde acetal resins, and partially hydrolyzed polyvinyl acetate resins on a flat vitreous support resistant to hydrogen chloride, the coating side of said support having a smooth surface which has been treated with a composition comprising an organo-silicon halide in vapor form, causing the coated material to set and dry, and thereafter removing the dried foil from said support.

2. The process according to claim 1 wherein the organo-silicon halide is an alkyl silicon chloride in vapor form.

3. The process according to claim 1 wherein the organo-silicon halide is methyl silicon chloride.

4. The process according to claim 1 wherein the organo-silicon halide is a mixture of methyl silicon chlorides consisting mainly of $(CH_3)SiCl_3$ and $(CH_3)_2SiCl_2$.

5. The method of making a photographic light filter foil which comprises coating an aqueous solution of an organic film-forming material selected from the class consisting of gelatin, hydroxyethyl cellulose, polyvinyl alcohol, polyvinyl acetaldehyde acetal resins, and partially hydrolyzed polyvinyl acetate resins on a flat vitreous support resistant to hydrogen chloride, the coating side of said support having a smooth surface which has been treated with the vapors of a mixture of methyl silicon chlorides consisting mainly of $(CH_3)SiCl_3$ and $(CH_3)_2SiCl_2$, causing the coated material to set and dry, and thereafter removing the dried foil from said support.

6. The method of making a photographic light filter foil which comprises coating an aqueous solution of a dyed hydroxy ethyl cellulose on a flat, smooth vitreous support resistant to hydrogen chloride, the coating side of said support having a smooth surface which has been treated with the vapors of a mixture of methyl silicon chlorides consisting mainly of $(CH_3)SiCl_3$ and $(CH_3)_2SiCl_2$, causing the coated material to set and dry, and thereafter removing the dried foil from said support.

7. The method of making a photographic light filter foil which comprises coating a dyed polyvinyl acetaldehyde acetal solution having a polyvinyl acetal content of 76.3% and an uncombined hydroxyl content of 22.1% on a flat vitreous support resistant to hydrogen chloride, the coating side of said support having a smooth surface which has been treated with the vapors of a mixture of methyl silicon chlorides consisting mainly of $(CH_3)SiCl_3$ and $(CH_3)_2SiCl_2$, causing the coated material to set and dry, and thereafter removing the dried foil from said support.

8. The process according to claim 5 wherein the flat, smooth support resistant to hydrogen chloride is glass.

9. The process according to claim 5 wherein the flat, smooth support resistant to hydrogen chloride is porcelain.

10. The process according to claim 5 wherein the flat, smooth support resistant to hydrogen chloride is fused silica.

VERNE H. RECKMEYER.

REFERENCES CITED

The following references are of record in the file of this patent:

UNITED STATES PATENTS

| Number | Name | Date |
|---|---|---|
| 1,981,472 | Schneider | Nov. 20, 1934 |
| 2,057,563 | Eckerbom | Oct. 10, 1936 |
| 2,173,471 | Broderick | Sept. 19, 1939 |
| 2,184,564 | Oxley et al. | Dec. 26, 1939 |
| 2,306,222 | Patnode | Dec. 22, 1942 |
| 2,320,431 | Hawtin et al. | June 1, 1943 |
| 2,332,559 | Daley et al. | Oct. 26, 1943 |